United States Patent
Lim et al.

(10) Patent No.: US 7,112,939 B2
(45) Date of Patent: Sep. 26, 2006

(54) MOBILE SYSTEM AND DRIVING METHOD THEREOF

(75) Inventors: Eul Gyoon Lim, Daejon (KR);
Dae-Hwan Hwang, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/289,077

(22) Filed: Nov. 29, 2005

(65) Prior Publication Data

US 2006/0138975 A1 Jun. 29, 2006

(30) Foreign Application Priority Data

Dec. 7, 2004 (KR) .................. 10-2004-0102474
Aug. 25, 2005 (KR) .................. 10-2005-0078309

(51) Int. Cl.
*B25J 5/00* (2006.01)
(52) U.S. Cl. ..................... 318/568.12; 901/1
(58) Field of Classification Search ........... 318/568.11, 318/568.12, 587, 651; 901/1
See application file for complete search history.

(56) References Cited

U.S. PATENT DOCUMENTS

| | | | | |
|---|---|---|---|---|
| 4,685,698 A | * | 8/1987 | Klinkner et al. | 280/5.515 |
| 6,278,253 B1 | * | 8/2001 | Hong | 318/568.13 |
| 6,341,244 B1 | * | 1/2002 | Papiernik | 700/170 |
| 6,452,355 B1 | * | 9/2002 | Forster et al. | 318/569 |
| 6,507,165 B1 | * | 1/2003 | Kato et al. | 318/611 |
| 6,580,245 B1 | * | 6/2003 | Quaschner et al. | 318/560 |
| 6,694,196 B1 | * | 2/2004 | Tuttle et al. | 700/28 |
| 6,937,908 B1 | * | 8/2005 | Chang et al. | 700/37 |

* cited by examiner

*Primary Examiner*—Bentsu Ro
(74) *Attorney, Agent, or Firm*—Ladas & Parry LLP

(57) ABSTRACT

The present invention relates to a mobile system and a moving method of the mobile system. According to the present invention, a natural period is measured from a vibration component signal generated by a force due to acceleration/deceleration of wheels, and the mobile system moves by applying an acceleration profile containing an acceleration period or a deceleration period based on the natural period. Therefore, the acceleration profile based on the natural period is applied such that vibration that is visible to a user is not generated during acceleration and deceleration of the mobile system. As a result, quality of the mobile system is improved.

20 Claims, 14 Drawing Sheets

MOBILE SYSTEM AND DRIVING METHOD THEREOF

CROSS-REFERENCE TO RELATED APPLICATION

This application claims priority to and the benefit of Korean Patent Application No. 10-2005-0078309 filed in the Korean Intellectual Property Office on Aug. 25, 2005, the entire contents of which are incorporated herein by reference.

BACKGROUND OF THE INVENTION (a) Field of the Invention

The present invention relates to a mobile system and a moving method of the mobile system.

(b) Description of the Related Art

In general, an apparatus that moves using wheels as moving means, such as a vehicle or a robot, is driven under a no-slip condition to obtain an accurate correlation between the rotation of the wheels and the movement of the moving apparatus. In addition, driving torque should be guaranteed on a rough surface of a road, and the wheels on a floor surface should not generate friction noise when the moving apparatus is an indoor mobile apparatus.

Therefore, the wheels with an elastic material (e.g., rubber tire) can be used, for example, to move a mobile robot while satisfying the no slip condition, as shown in FIG. 1. In addition, a suspension system having a structure similar to an automobile suspension system may be additionally required when the mobile robot moves along a rugged terrain. In this instance, the mass of a main body of the mobile robot may be similar to that of a body mounted on a spring apparatus 202, as conceptually shown in FIG. 2.

As shown in FIG. 3, the mobile robot that is driven by rotation of the wheels has characteristics such that a central portion of the mobile robot tends to move opposite to a moving direction of the mobile robot when acceleration and deceleration are generated at a lower portion of the main body, such that the mobile robot receives a moment of inertia created by the inertia force. Herein, the moment of inertia is proportional to the height of the center of gravity. Therefore, as shown in FIG. 4, the mobile robot vibrates to and fro or left to right even though the mobile robot moves along flat ground within a fixed coordinate system.

In the case of a vehicle, similar to a mobile object moving by tractions of wheels, a squat phenomenon occurs during hard acceleration such that front portion (hood) of the vehicle is lifted and the rear portion (trunk) is pressed down, and a nose dive phenomenon occurs during hard deceleration such that the hood is pressed down and the trunk is lifted. The squat and nose dive phenomena are very important design criteria for performance and safety of the vehicle. In addition, the feel of the squat and nose dive are important sensitivity evaluation criteria for a user.

Visible vibration of a mobile robot affects performance and user satisfaction when determining quality of the mobile robot.

For example, design and construction of an intelligent mobile robot becomes user-oriented when the robot interacts with a standing person. Thus, images of the person are captured through an embedded camera, or the person's voice that is captured through an embedded microphone is played through an embedded-speaker.

Therefore, the height of the robot is relatively greater than a distance (wheelbase) between the axle of front wheels and the axle of rear wheels or a distance (track) between the axle of right wheels and the axle of left wheels. Accordingly, an effect of the inertial force on the robot is visualized into vibration in to and fro or left to right direction, unlike a vehicle.

Vibration of the robot occurs when driving the robot using a speed profile while ignoring the above-mentioned characteristics of the robot. In addition, various vibration modes may be activated at once according to a frequency component of a vibration activating force applied to the mobile robot. In this instance, a vibration mode activated by the lowest frequency has high visibility because of a long period and large amplitude, and thus it may have a bad influence on a user's sensitivity evaluation.

Therefore an existing speed profile, such as a speed profile or an acceleration profile for driving a motor, is used as a speed profile for the mobile robot. A given acceleration is performed during an acceleration/deceleration period according to a trapezoidal speed profile, which is the most commonly used speed profile. However, discontinuity of acceleration causes other vibration modes to be activated. In addition, when an S-speed profile is used, acceleration linearly increases from 0 and then linearly decreases such that an impulsive force is rarely generated therefrom. However, the S-speed profile may produce a transient response when the linear acceleration/deceleration of the S-speed profile is not properly considered.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a mobile system having advantages of internally measuring a vibration phenomenon produced when the mobile system moves or stops.

In addition, the present invention provides a method for analyzing a measured vibration phenomenon such that vibration generated due to movement of a mobile system is hardly observed.

In one aspect of the present invention, there is provided a mobile system including a natural period measuring unit and a speed profile applying unit. The natural period measuring unit measures a natural period from a vibration component signal generated by external force or acceleration/deceleration of wheels. The speed profile applying unit applies a speed profile including an acceleration period or a deceleration period, the acceleration and deceleration periods being based on the natural period.

In another aspect of the present invention, there is provided a moving method of a mobile system. The moving method includes a) measuring a natural period from a vibration component signal generated by external force or acceleration/deceleration of wheels of the mobile system, and b) moving by applying a speed profile containing an acceleration period and a deceleration period based on the natural period.

DETAILED DESCRIPTION OF THE EMBODIMENTS

An exemplary embodiment of the present invention will hereinafter be described in detail with reference to the accompanying drawings. In particular, a wheeled mobile robot according to an exemplarily embodiment of the present invention will now be described in more detail. However, a mobile robot is only an exemplary embodiment of the present invention, and therefore the present invention is not limited to the following exemplarily embodiment.

Figure 1:
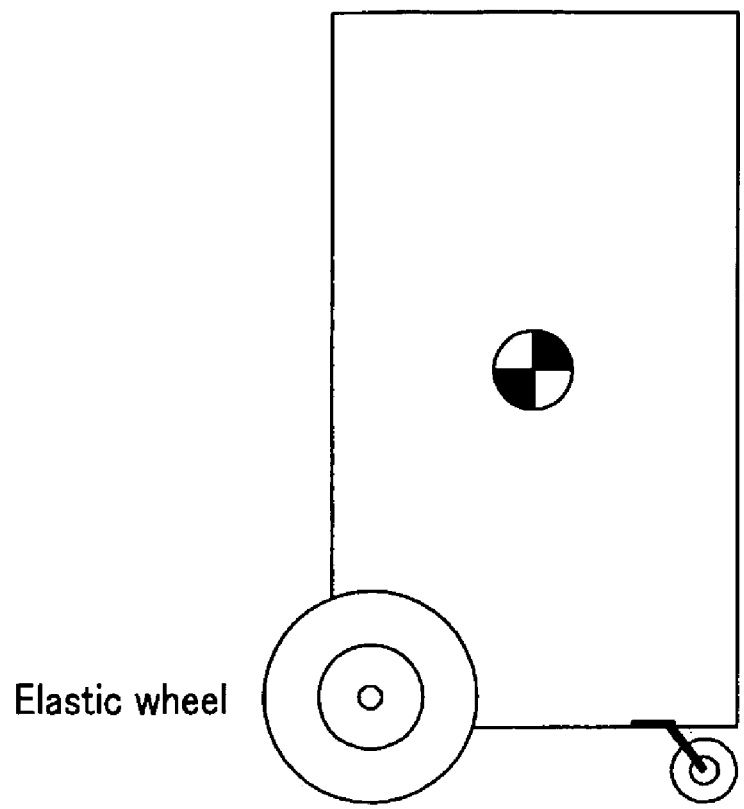
FIG. 1 is an exemplarily side view of a mobile robot having two elastic wheels and a caster.
Figure 2:
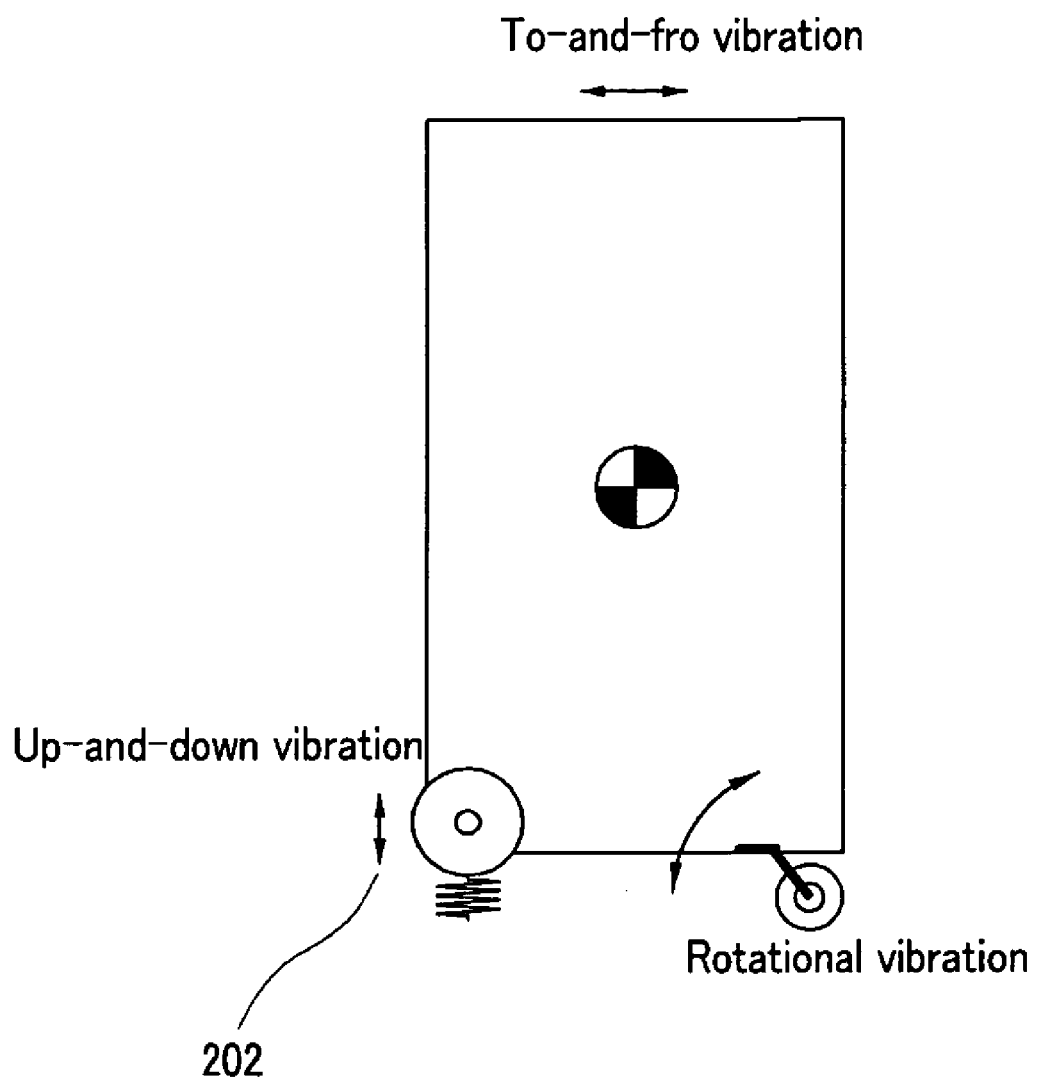
FIG. 2 shows a relationship between vertical and to-and-fro vibration and elastic wheels.
Figure 3:
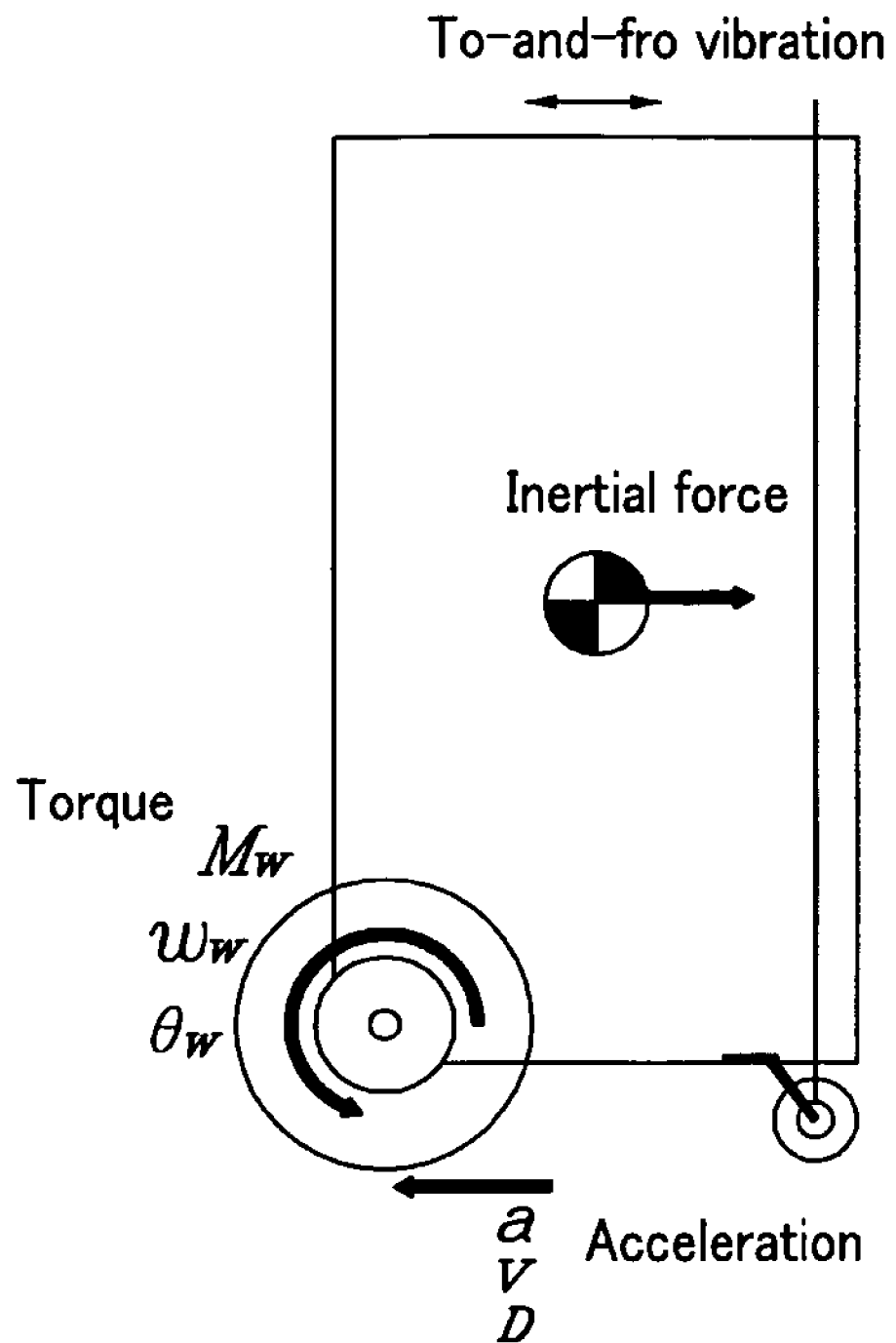
FIG. 3 shows acceleration of a mobile robot generated due to torque M applied to drive wheels and inertial force applied to the center of mass of a robot in a direction opposite to a moving direction.
Figure 4:
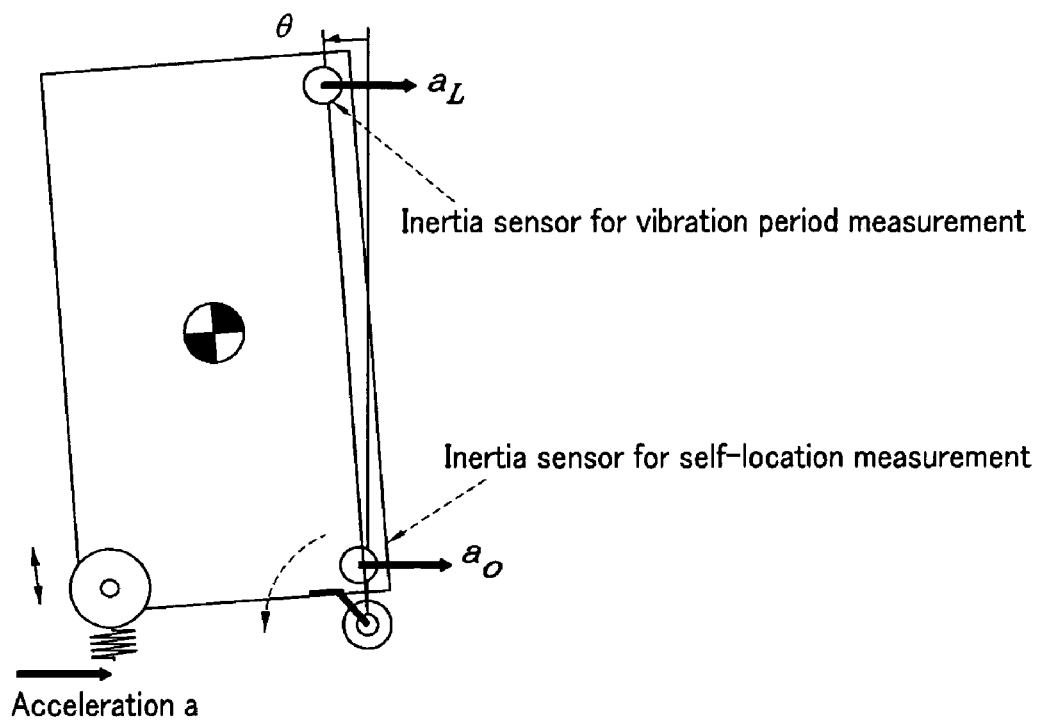
FIG. 4 shows an output $a_O$ of an inertia sensor for measuring a self-location (that is, a location of a mobile robot itself) and an output $a_L$ of an inertia sensor for measuring a vibration period when acceleration a(t) is applied using drive wheels.
Figure 5:
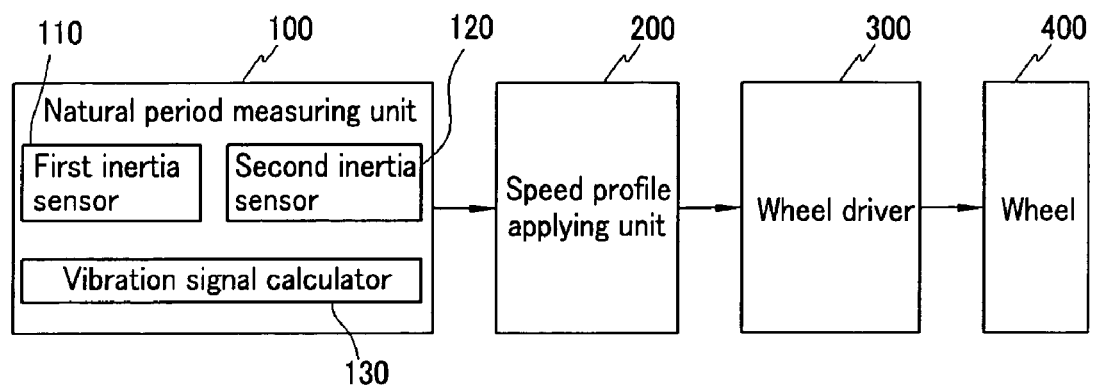
FIG. 5 is a schematic diagram of another mobile robot according to an exemplary embodiment of the present invention.

As shown in FIG. 5, a mobile robot system according to an exemplary embodiment of the present invention includes a natural period measuring unit 100, a speed profile applying unit 200, wheels 400, and a predetermined driving/running/move profile, that is, a wheel driver 300 for driving the wheels using an acceleration profile.

The natural period measuring unit 100 includes a first inertia sensor 110, a second inertia sensor 120, and a vibration signal calculator 130, and measures a natural period of a moving object. In addition, the speed profile applying unit 200 is for driving the mobile system according to a driving profile based on the natural period.

The mobile robot estimates a state of movement using the first inertia sensor 110 provided for estimating a self-location (that is, a location of the mobile robot itself).

The second inertia sensor 120 is provided in a location where vibration of the mobile robot is maximized, and it detects vibration of the robot. The location of the second inertia sensor 120 is relatively higher than that of the first inertia sensor 110. In general, a location where vibration of a structured object is maximized is determined from a mode shape obtained by a modal analysis method. In the case that the structured object is very flexible, the mode shape is obtained by a finite element analysis.

The first inertia sensor 110 or the second inertia sensor 120 may include an inertia sensor (e.g., acceleration sensor) outputting an analogue signal of between 0V and 10V. At this time, a speed signal is obtained by performing integration on the acceleration analogue signal, and movement of the robot may be measured by performing integration on the speed signal for conversion of the speed signal into a displacement signal, wherein the acceleration analogue signal is an output value of the acceleration sensor. The movement of the mobile robot may also be measured by using an analogue integral means in each process, or by applying a microprocessor means and a numerical analysis routine to each process after converting the acceleration analog signal into a digital signal.

The vibration signal calculator 130 may calculate a robot vibration signal using an output value difference between the first inertia sensor 110 and the second inertia sensor 120.

That is, acceleration and deceleration cause vibration of a mobile object having a height greater than a distance between the axle of front wheels and the axle of rear wheels or a distance between the axle of left wheels and the axle of right wheels, and the vibration is rather a rotational motion with respect to an instantaneous center (nodal axis) than a translational motion.

When the mobile robot has a fixed rotational center such as a shaft, vibration of the mobile robot may be easily measured by attaching an angle sensor (e.g., an encoder) to the fixed rotational center. However, it is difficult to measure the vibration using the angle sensor when the mobile robot is supported by an elastic member.

Therefore, a vibration mode of the mobile robot is measured by using the output value difference between the first inertia sensor 110 including the inertia sensor used for self-location measurement and the second inertia sensor 120 attached to a location where vibration of the mobile robot is maximized due to an elastic element of each suspension component of the robot.

Figure 6:
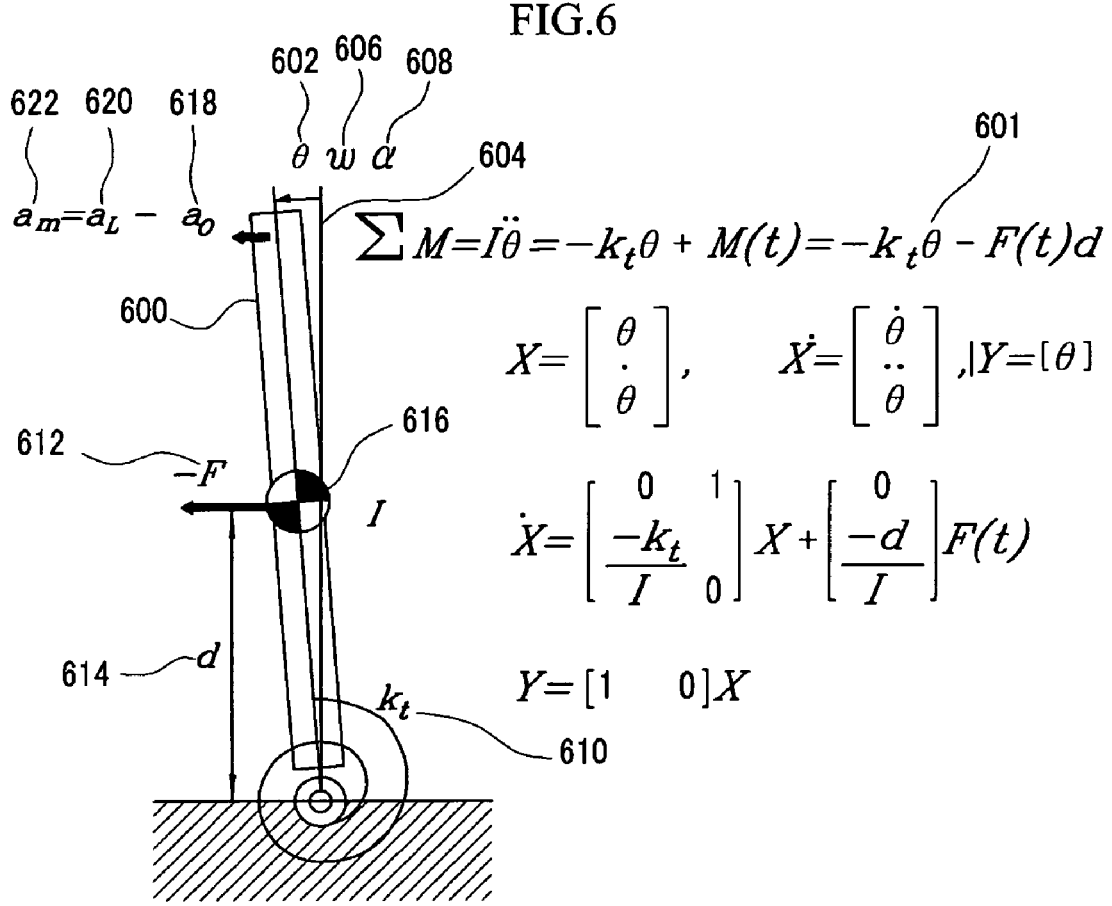
FIG. 6 shows a simulation of applying external force to a general rotational vibration system and equations applied to the simulation.

FIG. 6 shows a simulation draft and a state form for simulation of applying an external force to a typical rotational vibration system.

That is,

θ 602 is an angle measured with respect to an equilibrium point 604 (vertical line from ground) such that the angle measured in the anticlockwise direction is positive (+), $\dot{\theta}=\omega$ 606 is angular velocity, and $\ddot{\theta}=\alpha$ 608 is angular acceleration.

The equation 601 shown in FIG. 6 is defined as a sum ΣM of moments M with respect to a fixed point of a bar, and the sum ΣM is obtained by performing addition of a moment of a torsional spring having a spring constant $K_t$ 610 and a moment of inertial force −F 612 applied in an opposite direction of inertial force F applied to the mobile robot.

At this point, the moment of the torsional spring 610 is proportional to a rotation angle θ 602, and a direction of the moment is opposite to a sign of the rotation angle θ 602. Thus, the bar 600 tends to rotate in an opposite direction due to acceleration caused by the moment of the torsional spring 610. The height d 614 is measured from the center of weight 616 to the ground. At this time, a value of the moment becomes −($k_t$·θ), and a value of the moment of inertia force −F becomes +(−F·d), and accordingly, the vibration equation 601 becomes ΣM=−$k_t$θ−Fd as shown in FIG. 6.

In addition, when θ 602 and $\dot{\theta}$ 606 are respectively substituted with parameters of x, and $x_1=\theta$ and $x_2=\dot{\theta}$, so that $\dot{x}_1=\dot{\theta}=x_2$ and $\ddot{\theta}=\dot{x}_2$ are substituted to the vibration equation

601, the following equation is retrieved $I\ddot{\theta}=I\dot{x}_2=-k_t x-Fd$. Using a matrix and a vector, the retrieved equation is expressed as follows.

$$X = \begin{bmatrix} x_1 \\ x_2 \end{bmatrix} = \begin{bmatrix} \theta \\ \dot{\theta} \end{bmatrix}$$

$$\dot{X} = \begin{bmatrix} \dot{x}_1 \\ \dot{x}_2 \end{bmatrix} = \begin{bmatrix} x_2 \\ -\dfrac{k_t}{I}x - \dfrac{Fd}{I} \end{bmatrix} = \begin{bmatrix} 0 & 1 \\ -\dfrac{k_t}{I} & 0 \end{bmatrix} \begin{bmatrix} x_1 \\ x_2 \end{bmatrix} + \begin{bmatrix} 0 \\ -\dfrac{d}{I} \end{bmatrix} F = \begin{bmatrix} 0 & 1 \\ -\dfrac{k_t}{I} & 0 \end{bmatrix} X + \begin{bmatrix} 0 \\ -\dfrac{d}{I} \end{bmatrix} F$$

At this time, X is called a state vector and is a vector of state parameters representing a state of a vibration system. A given state vector is observed, or an interested equation value Y is obtained by multiplying an appropriate matrix to the state vector X.

Since an angle θ response is usually observed in a wheeled mobile system according to an exemplary embodiment of the present invention, the angle θ response with respect to vibration may be obtained from $$Y = [\theta] = [x_1] = [1 \; 0] \begin{bmatrix} x_1 \\ x_2 \end{bmatrix} = [1 \; 0]X$$

That is, for a mobile robot moving by rotation of wheels, for example, inertial force F is applied to a center portion of the robot in a direction opposite to an acceleration direction, and a moment is applied to the center portion of the robot when torque M is applied to a lower portion (that is, a driver wheel) of a main body of the robot, wherein the moment is proportional to a height d 614 of the center of weight 616.

At this time, now referring back to FIG. 5, the first inertia sensor 110 used for self-location measurement may be irrelevant to vibration of the robot, and the second inertia sensor 120 may output a signal representing a vibration phenomenon of the mobile robot as the second inertia sensor 120 is located relatively higher than the first inertia sensor 110.

For example, when the first inertia sensor 110 and the second inertia sensor 120 use an acceleration system, the second inertia sensor 120 outputs a signal containing a vibration component when the mobile robot is moving in a constant velocity or standing still. In addition, a signal output from the second inertia sensor 120 contains an acceleration/deceleration component when the mobile robot is in a state of acceleration or deceleration.

At this time, now referring to FIGS. 5–6, the vibration signal calculator 130 subtracts an output value $a_O$ 618 of the first inertia sensor 110 provided for self-location measurement from an output value $a_L$ 620 of the second inertia sensor 120 provided in a location where vibration due to elastic elements of each parts of the robot is maximized, such that a pure vibration component am 622 is obtained. A natural period of the vibration phenomenon is measured from the vibration component, and accordingly, vibration of the mobile robot may be suppressed by applying driving torque designed to insure freedom from natural vibration to thereby improve sensitivity quality of the mobile robot. In addition, the possibility of rollover may be reduced by suppressing unnecessary vibration, and accordingly, moving speed increases.

A method for obtaining a natural vibration period of the mobile robot will now be described in more detail.

A current natural vibration period (hereinafter, referred to as a natural period) of the mobile robot is determined by observing a response of an inertia sensor with respect to a given force applied to a main body of the mobile robot through wheels during an initialization sequence of the mobile robot or after an external mass is attached to the mobile robot.

A natural period is a characteristic of a mobile object (e.g., a mobile robot), and it is possible to predict vibration caused by acceleration/deceleration of wheels or external force applied to a main body of the mobile robot using the natural period.

Assuming that the wheels of the mobile robot are in no-slip condition, acceleration and deceleration of the wheels accelerate and decelerate the mobile robot so that the mobile robot vibrates to and fro along a moving direction in a coordinate system fixed to the robot. When the robot is in a standby mode and waiting for a user command, vibration can be generated with an impulse applied to the wheels of the mobile robot, and the natural period is measured by using the inertia sensor. In addition, when it is difficult to perform unit step acceleration, making the mobile robot move at a low uniform speed using a trapezoidal speed profile, and then performs an emergency stop after a transient response is disappeared, then a unit step response is also obtained.

As described above, a pure rotational vibration signal of the mobile robot is obtained by using the acceleration system with the inertia sensor and removing the output value of the first inertia sensor 110 from the output value of the second inertia sensor 120. When the height of the mobile robot is greater than a distance between the axle of front wheels and the axle of rear wheels, acceleration measured by second inertia sensor became greater because angular acceleration is proportional to a rotation radius. Therefore, the vibration signal becomes more pronounced as a distance between the first inertia sensor 110 and the second inertia sensor 120 increases, and a vibration period can be easily obtained from a whole signal containing the vibration signal.

There may be several vibration periods when the robot has several vibrational modes, but the longest vibration period is most visible and highly affects dynamic safety of the mobile robot. According to an embodiment of the present invention, therefore, the acceleration/deceleration of the mobile robot is controlled based on the longest vibration period.

Figure 7:
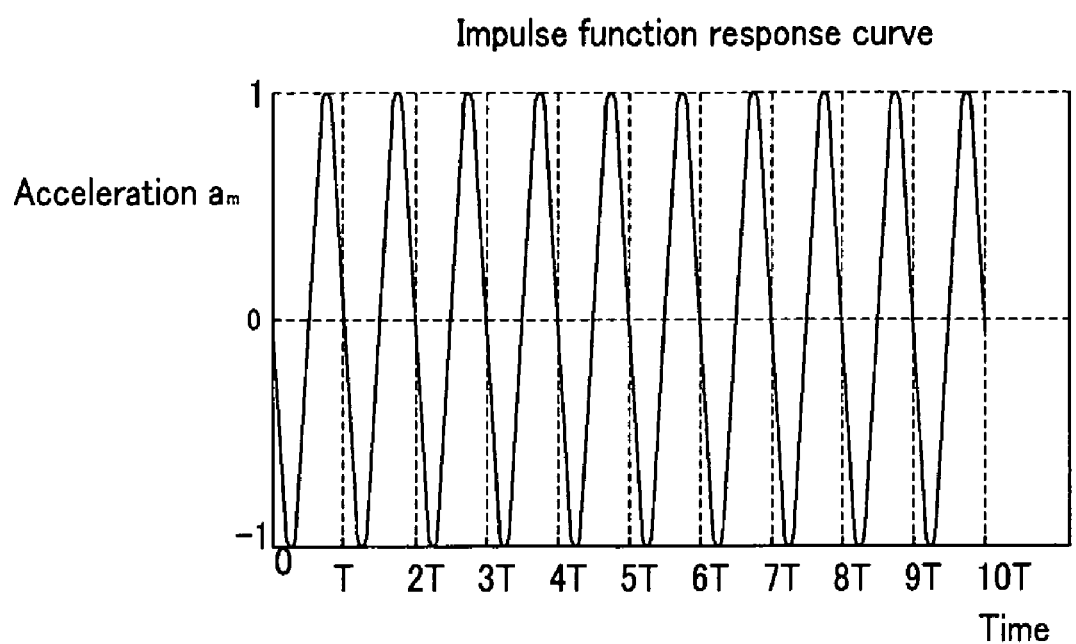
FIG. 7 shows a natural period given by an impulse response function.

As shown in FIG. 7, a time-axis crossing period becomes a natural period of the mobile robot when the vibration component retrieved from an output value difference between the first inertia sensor 110 and the second inertia sensor 120 is a response to an impulse function. Otherwise, a modal analysis method is applied to obtain a natural period of a moving object.

The speed profile applying unit 200 (FIG. 5) sets a speed profile based on the natural period of the mobile robot.

The simplest theoretical speed profile is a square wave corresponding to the vibration period. The mobile robot accelerates in a form of unit impulse function to a desired speed and moves a predetermined distance, and then the mobile robot stops by accelerating in the form of the unit impulse function of a direction opposite to its moving direction. Assuming that such a speed profile is set and the wheels are slip-free, vibration after stopping may be eliminated by superposition of the two unit impulse response functions if and only if acceleration and deceleraton are perfectly performed and a constant velocity period is maintained during a period corresponding to the natural period. Vibration of the mobile robot is easily observed during the constant velocity period, and excessive vibration may occur during the constant velocity period.

In addition, the mobile robot accelerates with a predetermined velocity for a predefined time frame when a trapezoidal speed profile is applied, and thus acceleration values at points (start of acceleration, start of constant velocity, start of deceleration, and stop) of this profile are not steady (called "jerk"). As a result, vibration is produced by superposition of a step response function.

In addition, when an S-curve speed profile is applied, the S-curve speed profile linearly increasing/decreasing acceleration, it is difficult to control undesired vibration because infinite frequencies form a linear acceleration function.

Therefore, the speed profile applying unit 200 may apply the following acceleration profile.

$$a_{acc}(t) = \frac{v_{ov}}{2T}\left(1 - \cos\frac{\pi t}{T}\right), 0 \le t \le 2T \quad \text{[Equation 1]}$$

(where $v_{ov}$ is constant velocity)

A single-frequency trigonometric function curve is applied according to this profile, and thus acceleration starts from a zero level and ends at a zero level. Therefore, there is no jerk causing undesired vibration. This profile may be retrieved through simulation.

Figure 8:
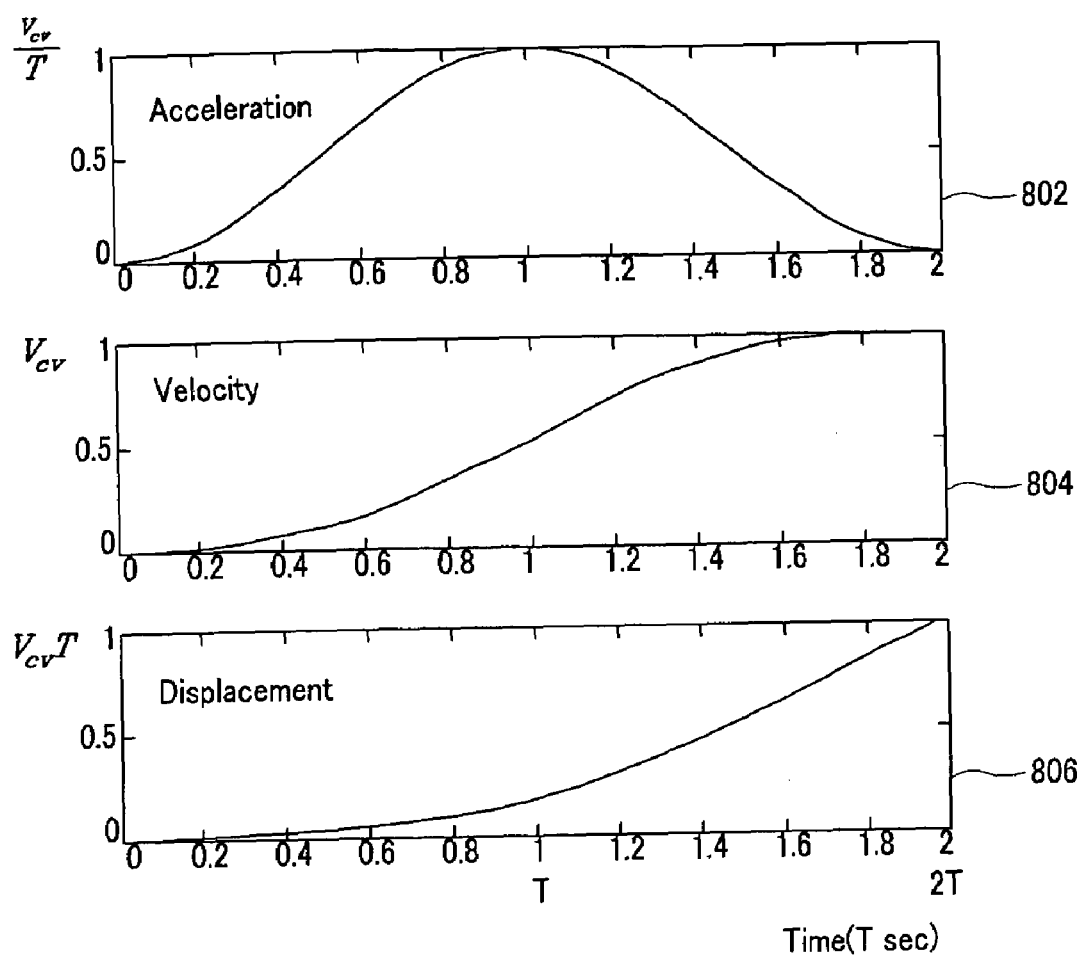
FIG. 8 shows graphs illustrating an acceleration profile, speed, and displacement based on a natural period.

Equation 2 shows velocity and displacement equations according to the acceleration profile of Equation 1, and the graphs of the respective equations are shown in FIG. 8. FIG. 8 shows graphs illustrating an acceleration profile 802, speed 804, and displacement 806 based on a natural period.

$$v_{acc}(t) = \frac{v_{cv}}{2T}\left(t - \frac{T}{\pi}\sin\frac{\pi t}{T}\right), 0 \le t \le 2T \quad \text{[Equation 2]}$$

$$S_{acc}(t) = \frac{v_{ov}}{2T}\left(\frac{1}{2}t^2 + \left(\frac{T}{\pi}\right)^2\left(\cos\frac{\pi t}{T} - 1\right)\right), 0 \le t \le 2T$$

Therefore, the total moving distance while the above acceleration profile is applied while the mobile robot is in a stop mode and the speed of the mobile robot after the acceleration profile is applied are given as follows.

Total moving distance while the speed profile is applied:

$$S_{acc}(2T) = v_{cv}T$$

Speed after the speed profile is applied:

$$v_{acc}(2T) = v_{cv}$$

Figure 9:
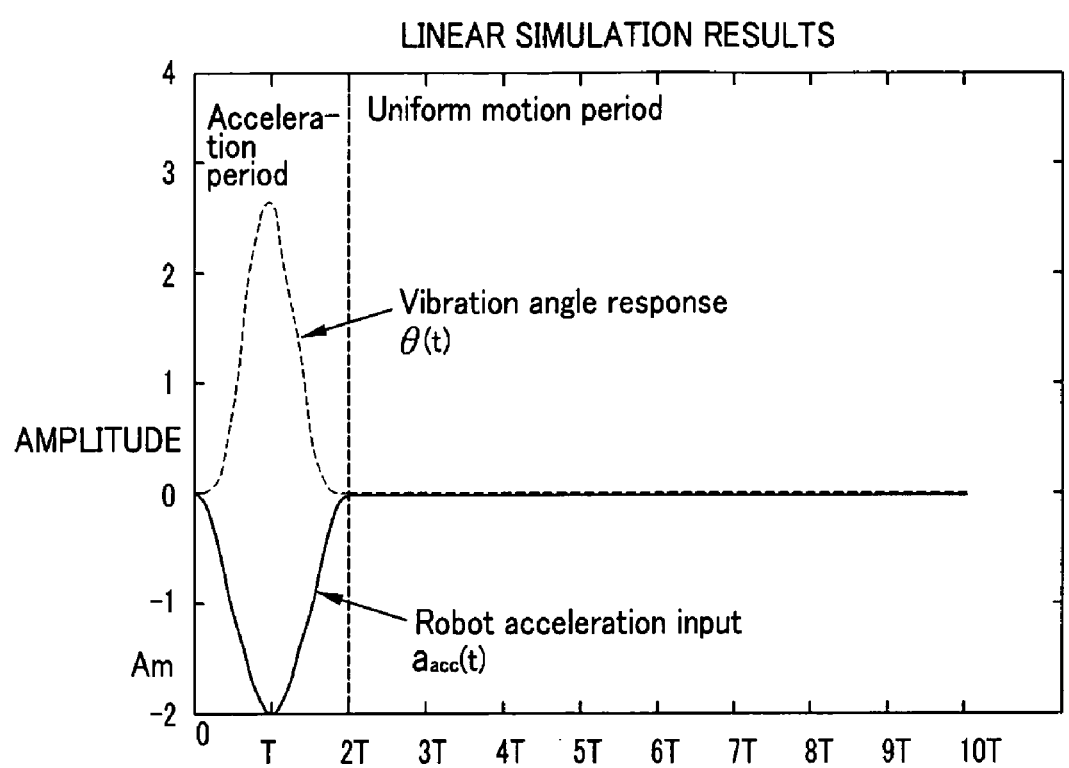
FIG. 9 shows a graph for illustrating an acceleration profile (solid line) based on a natural period and an angle response (dotted line) of a mobile robot.

As shown in FIG. 9, when the acceleration profile such as 802 is applied, an angle response deviates from a balanced position (0 in FIG. 9) due to acceleration force. However, the angle response reverts to the balanced position and is maintained at 0 as the acceleration force disappears.

The mobile robot is tilted to a given angle in any direction and returned to its original position because the vibration phenomenon does not occur while the mobile robot starts accelerating. However, it is difficult to observe the tilting since the mobile robot itself is accelerating its motion.

The mobile robot in the constant velocity at a speed of $v_0$ stops when the following deceleration profile is applied.

$$a_{dec}(t) = -a_{acc}(t), 0 \le t \le 2T \quad \text{[Equation 3]}$$

Figure 10:
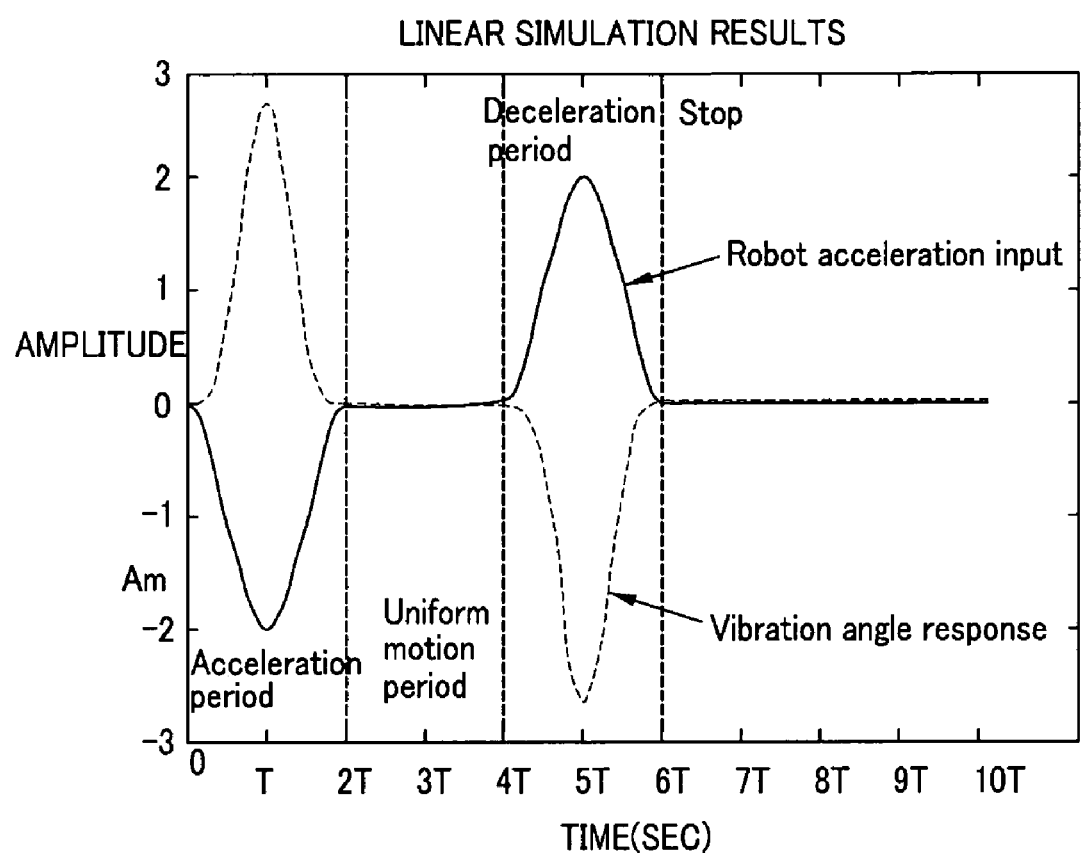
FIG. 10 is a graph showing an acceleration profile (solid line) and an angle response (dotted line) of a robot according to acceleration, constant velocity, and deceleration.

At this time, an acceleration profile and a response when the mobile robot starts accelerating and then moves in constant velocity are shown in FIG. 10.

In addition, the acceleration profile of FIG. 10 does not cause vibration after acceleration even though the profile is changed, such that an acceleration period of the mobile robot increases an even number of times (two times, four times, and so on) to a natural period, as shown in Equation 4.

$$a_{acc}(t) = \frac{v_{ov}}{2nT}\left(1 - \cos\frac{\pi t}{nT}\right), 0 \le t \le 2nT \quad \text{[Equation 4]}$$

(where n is a natural number)

On the other hand, driving a typical robot is divided into an acceleration period, a constant velocity period, and a deceleration period. Accordingly, a total traveling time $t_{total}$ is divided into acceleration time, constant velocity time, and deceleration time. At this time, a mobile object internally calculates constant velocity time when a typical trapezoidal speed profile is applied and constant velocity $V_{cv}$, acceleration time $t_{acc}$, deceleration time $t_{dec}$, and a total moving distance $S_{total}$ are set.

On the other hand, when an acceleration profile according to an exemplary embodiment of the present invention is applied, the acceleration and deceleration times become a constant number times the natural period for a limited total moving distance $S_{total}$. Therefore, the time for maintaining constant velocity and constant velocity of the mobile robot may be changed.

In addition, when the mobile robot moves to a predetermined speed, the acceleration time is set based on the natural period. Therefore, a user is able to set a total moving distance and speed during a constant velocity period, and the speed profile applying unit 200 determines acceleration/deceleration time and other constant velocity times using the speed set by the user and the natural period of the mobile robot.

The following description is related to determination of a profile parameter when the acceleration/deceleration profile is applied by the speed profile applying unit 200 during 2 times the natural period.

$$t_{total} = t_{acc} + t_{ov} + t_{dec} = 4T + t_{cv} \ge 4T$$

$$S_{total} = S_{acc}(2T) + v_{cv}t_{cv} + S_{dec}(2T) = 2v_{cv}T + v_{ov}t_{ov}$$

$$t_{ov} = \frac{S_{total}}{v_{cv}} - 2T \ge 0, v_{cv} \le \frac{S_{total}}{2T},$$

$$v_{cv} = \frac{S_{total}}{2T}, t_{ov} = \frac{S_{total}}{v_{cv}} - 2T \left(\text{if } v_d > \frac{S_{total}}{2T}\right)$$

$$v_{cv} = v_d, t_{ov} = 0 \left(\text{if } v_d \le \frac{S_{total}}{2T}\right)$$

A maximum value $\text{Max}(a_{acc}(t))$ of the acceleration profile is produced at a half time T of acceleration time 2T, and the maximum value should satisfy Equation 5.

$$\text{Max}(a_{acc}(t)) = a_{acc}(T) = \frac{v_{cv}}{T} \le A_{max} \quad \text{[Equation 5]}$$

Figure 11:
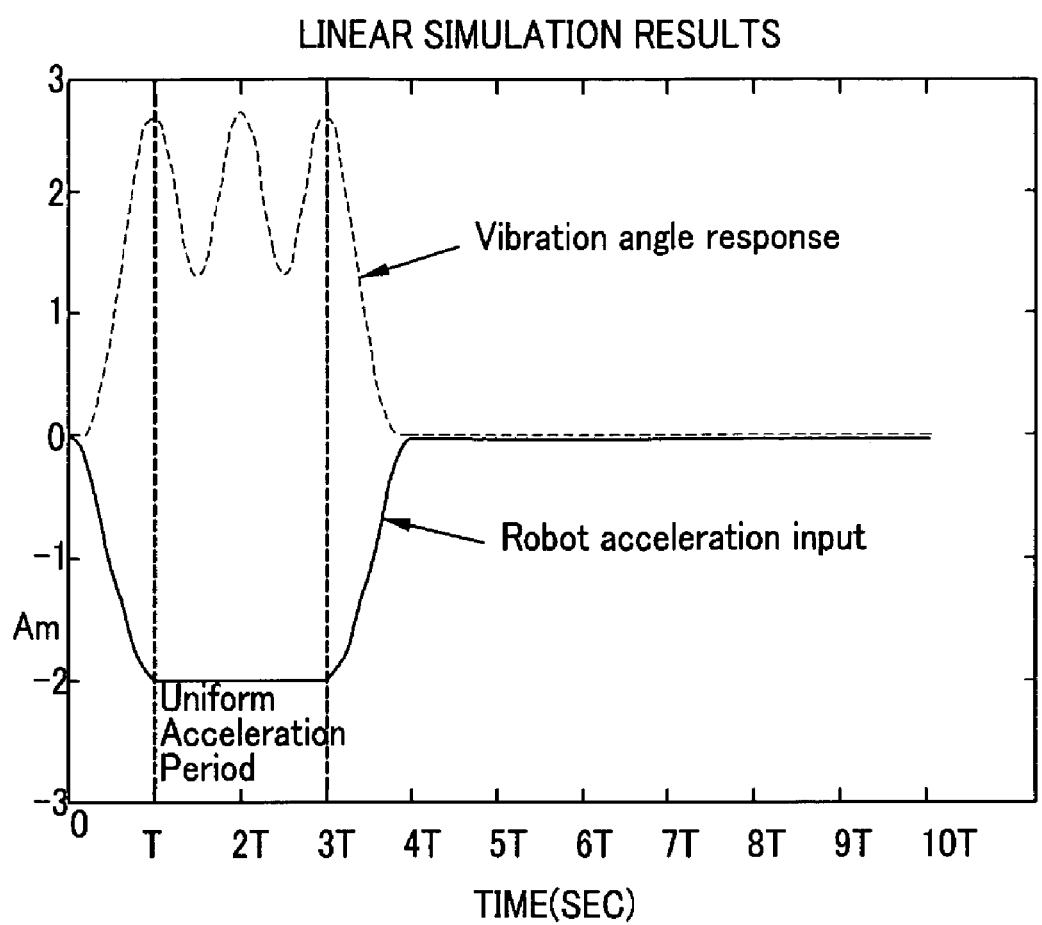
FIG. 11 exemplarily shows transformation of an acceleration profile for high speed driving.

That is, the maximum value of the acceleration profile should be lower than a maximum acceleration $A_{max}$ of the wheel driver 300 in consideration of performance of the wheel driver 300. Therefore, as shown in FIG. 11, when decreasing the constant velocity $V_{ev}$ to make the maximum value of the acceleration profile satisfy Equation 5, the speed profile applying unit 200 adds a uniform acceleration period at the half time T to increase constant velocity such that the mobile robot travels a total moving distance within a shorter period of time, the uniform acceleration period corresponding to an integer times the half time T.

At this time, although vibration of the mobile robot occurs during a uniform acceleration period, rotational vibration of the mobile robot is hardly seen when the mobile robot is accelerating its motion. In addition, the rotational vibration is finished when the mobile robot is in the constant velocity, and thus, the mobile robot moves without vibration.

Figure 12A:
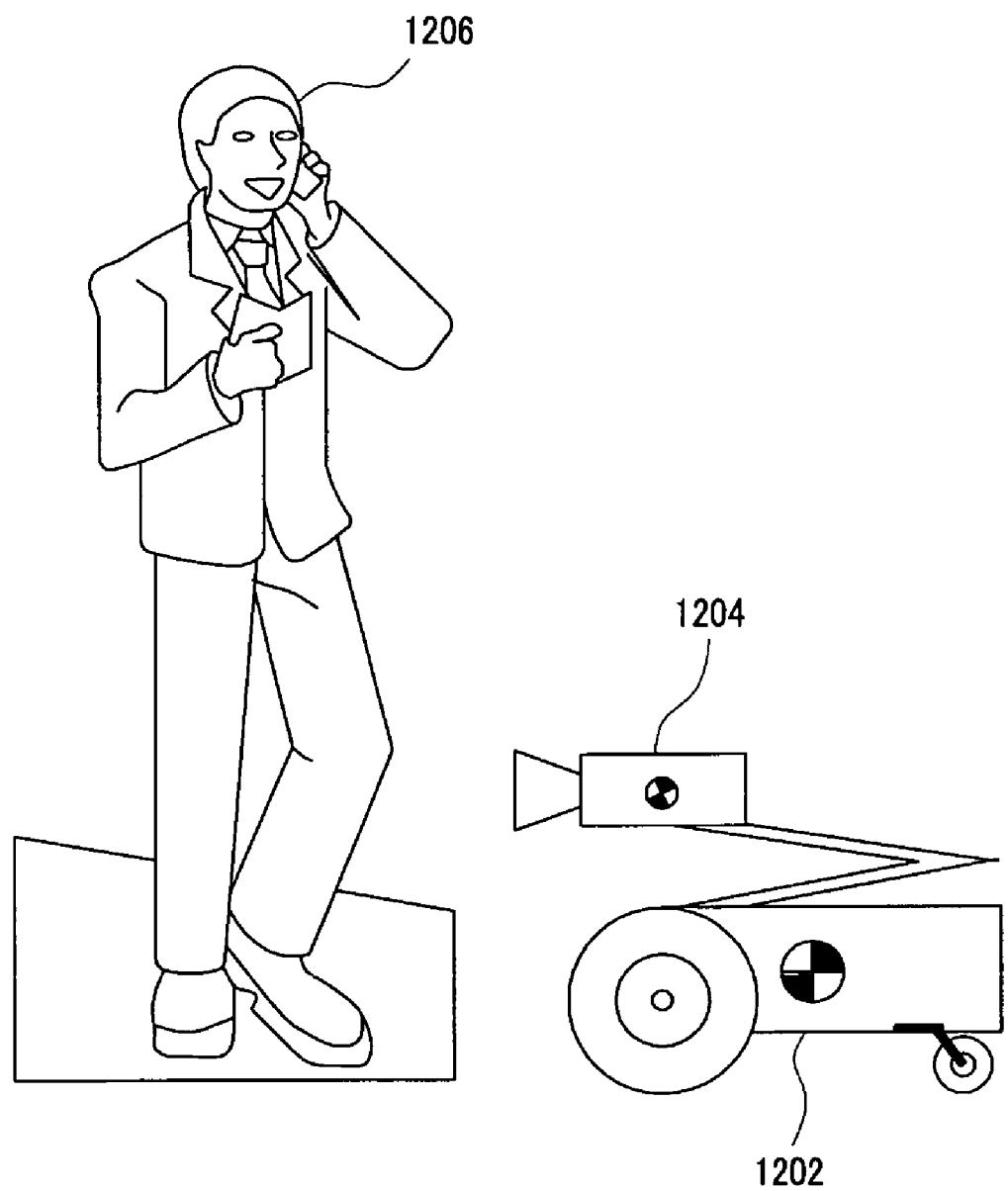
FIGS. 12A–12B show an interactive mini robot on which a camera is mounted according to an exemplary embodiment of the present invention.
Figure 12B:
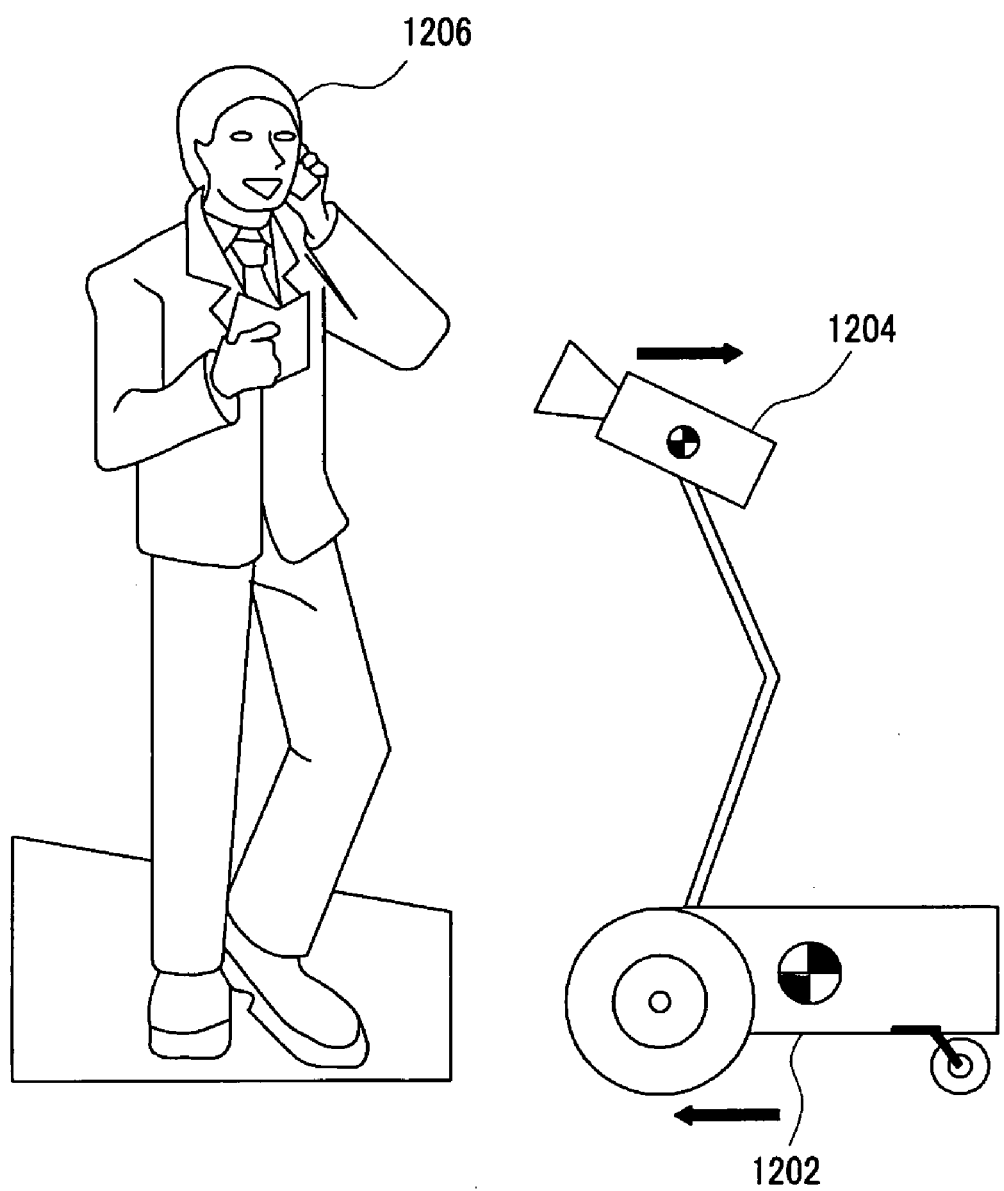

Therefore, as shown in FIGS. 12A–12B, when the acceleration profile according to the embodiment of the present invention is applied to a wheeled mini mobile robot 1202 having a camera 1204 mounted thereon, the mobile robot 1202 can move without shaking the camera due to the rotational vibration.

In particular, when a flexible height control apparatus is provided between the camera 1204 and the main body of the mobile robot 1202 to set the camera close to eyes of a person 1206 while minimizing the size of the main body, the mini mobile robot may move stably, according to an exemplary embodiment of the present invention.

Figure 13:
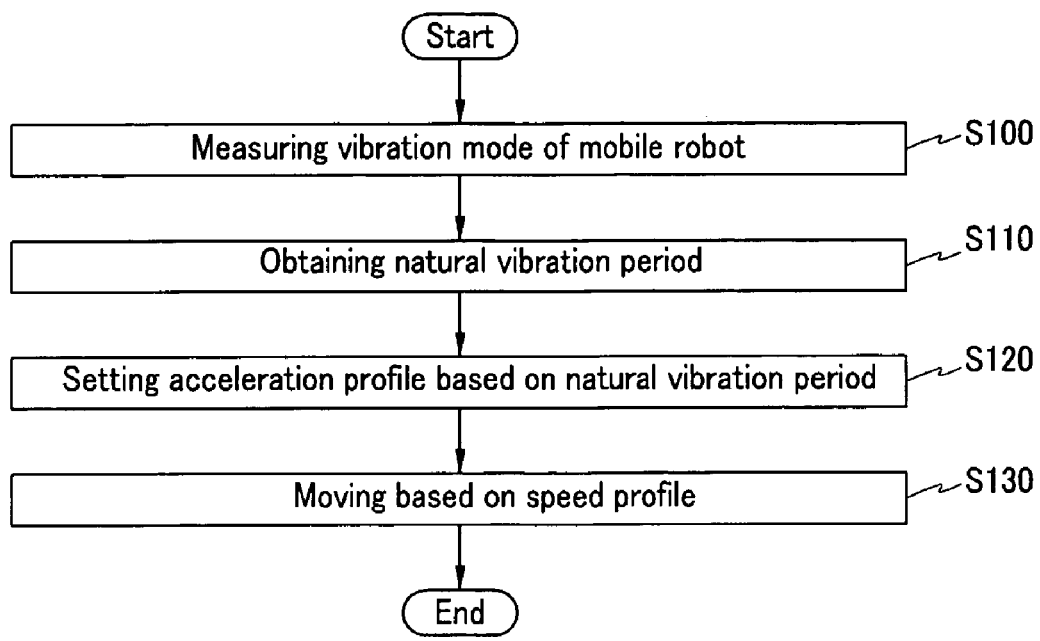
FIG. 13 is a flowchart of a moving method of a mobile system using wheels according to an exemplary embodiment of the present invention.

A method for moving a mobile apparatus using the wheels 400 according to an exemplary embodiment of the present invention will now be described in more detail with reference to FIG. 13.

When the mobile apparatus, that is, a mobile robot, moves using the wheels 400, a vibration mode of the mobile robot is measured in step S100.

At this time, the vibration mode is measured by using an output value difference between a first inertia sensor 110 and a second inertia sensor 120.

In more detail, the first inertia sensor 110 includes an inertia sensor used for self-location measurement, and the second inertia sensor 120 includes an inertia sensor and outputs a vibration component or an acceleration/deceleration component of the mobile robot according to a state of a motion of the mobile robot.

A vibration signal calculator 130 obtains a pure vibration component $a_m$ by subtracting an output value $a_L$ of the first inertia sensor 110 from an output value $a_m$ of the second inertia sensor 120, so as to measure the corresponding vibration mode of the mobile robot.

In addition, a natural vibration period is derived from the corresponding vibration mode of the mobile robot in step S110. A time-axis crossing period of a measured signal corresponds to the natural vibration period when the vibration mode is a response to an impulse function. Otherwise, the natural vibration period is obtained by applying a modal analysis method.

Subsequently, an appropriate moving profile for the mobile robot is set from the derived natural vibration period in step S120. That is, an acceleration profile based on the derived natural vibration period may be applied, and an appropriate acceleration profile derived from a simulation is given by Equation 1. In addition, a deceleration profile for stopping the mobile robot in constant velocity is given by Equation 3.

When the acceleration profile according to the exemplary embodiment of the present invention is applied and the total moving distance is limited, acceleration and deceleration time is limited to constant times a natural period and constant velocity maintaining duration and constant velocity of the mobile robot are set by a user.

In addition, when the acceleration profile according to the exemplary embodiment of the present invention is applied and the mobile robot moves at a predetermined speed, acceleration and deceleration time are set based on the natural period. The constant velocity and the total moving distance are set by a user, and the mobile robot may be able to internally determine acceleration/deceleration time and other uniform times based on the constant velocity and the total moving distance.

As such, a profile parameter is determined by applying the acceleration/deceleration profile during constant number times the natural period, and a moving profile is set in consideration of performance of the mobile robot such that movement of the mobile robot appears stable, in step S130.

According to the embodiments of the present invention, the acceleration profile based on the natural period is applied such that vibration that is visible to a user is not generated during acceleration and deceleration of the mobile object. As a result, quality of the mobile object is improved.

In addition, the mobile object is able to measure its natural period by itself using the inertia sensor provided therein, and accordingly, it is able to minimize vibration when a configuration of the mobile object is changed or an additional mass is attached to the mobile object and thus the natural period is changed. The mobile object is also able to measure a natural period that changes according to elasticity of wheels or elastic conditions of the ground.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mobile system having a main body comprising a wheel, the mobile system comprising:
   a natural period measuring unit for measuring a natural period from a vibration component signal generated by an external force or acceleration/deceleration of the wheel; and
   a speed profile applying unit for applying a speed profile including an acceleration period or a deceleration period to drive the wheel, the acceleration and deceleration periods being based on the natural period.

2. The mobile system of claim 1, wherein the natural period measuring unit comprises two inertia sensors, and measures a vibration mode from an output value difference between the two inertia sensors respectively disposed in different locations.

3. The mobile system of claim 2, wherein at least one of the two inertia sensors is an acceleration sensor.

4. The mobile system of claim 1, wherein the natural period measuring unit comprises:
   a first inertia sensor for measuring a location of the mobile system;
   a second inertia sensor provided relatively higher than the first inertia sensor, and outputting a signal containing a vibration phenomenon; and
   a vibration signal calculator for calculating a vibration component by removing an output value of the first inertia sensor from an output value of the second inertia sensor.

5. The mobile system of claim 1, wherein the natural period is a time-axis crossing period of a measured vibration component signal when the vibration component is a response to an impulse function.

6. The mobile system of claim 1, wherein the natural period denotes the longest period when the vibration component signal has a plurality of periods.

7. The mobile system of claim 1, wherein the speed profile applying unit uses an acceleration profile based on the natural period, the acceleration profile being derived from $$a_{acc}(t) = \frac{V_{ov}}{2nT}\left(1 - \cos\frac{\pi t}{nT}\right), 0 \le t \le 2nT$$

wherein $a_{acc}$ is the acceleration during an acceleration period, $V_{ev}$ is a constant velocity, n is a natural number, and T is a natural period.

8. The mobile system of claim 1, wherein the speed profile applying unit applies a deceleration profile based on the natural period, the deceleration profile being derived from $$a_{dec}(t) = -a_{acc}(t), 0 \le t \le 2T$$

$$a_{acc}(t) = \frac{V_{ov}}{2nT}\left(1 - \cos\frac{\pi t}{nT}\right), 0 \le t \le 2nT$$

wherein $a_{acc}$ is the acceleration during an acceleration period, $a_{dec}$ is the deceleration during an acceleration period, $V_{ev}$ is a constant velocity, n is a natural number, and T is a natural period.

9. The mobile system of claim 7, wherein a maximum value of the acceleration profile is lower than a maximum acceleration of the wheels, and satisfies the following equation:

$$\text{Max}(a_{acc}(t)) = a_{acc}(T) = \frac{V_{cv}}{T} \le A_{\max}$$

wherein Max $(a_{acc})$ is the maximum value of the acceleration profile, and $A_{max}$ is the maximum acceleration of the wheel.

10. The mobile system of claim 9, wherein, when the maximum value of the acceleration profile satisfies the equation of claim 9 by reducing the constant velocity, the speed profile applying unit adds a uniform acceleration period at a maximum speed profile for increasing the constant velocity and moving a total moving distance within a shorter period of time, the uniform acceleration period corresponding to an integer times the maximum speed profile.

11. A moving method of a mobile system having a main body comprising a wheel, the method comprising:
a) measuring a natural period from a vibration component signal generated by external force or acceleration/deceleration of the wheel of the mobile system; and
b) moving by applying a speed profile containing an acceleration period and a deceleration period based on the natural period.

12. The moving method of claim 11, wherein a) comprises measuring a vibration mode through an output value difference between two inertia sensors respectively disposed in different locations in the mobile system.

13. The moving method of claim 12, wherein the inertia sensors are acceleration sensors.

14. The moving method of claim 12,
wherein one inertia sensor (referred to as a first inertia sensor) measures a location of the mobile system;
wherein the other inertia sensor (referred to as a second inertia sensor) is provided relatively higher than the first inertia sensor and outputs a signal containing a vibration phenomenon; and
wherein in a), the natural period is measured by subtracting an output value of the first inertia sensor that measures a location of the mobile system without consideration of the vibration phenomenon from an output value of the second inertia sensor outputting a signal containing the vibration phenomenon, and calculating the vibration component by removing an output value of the first inertia sensor from an output value of the second inertia sensor.

15. The moving method of claim 11, wherein the natural period is a time-axis crossing period of a measured vibration component signal when the vibration component is a response to an impulse function.

16. The moving method of claim 11, wherein the natural period denotes the longest period when the vibration component signal contains a plurality of periods.

17. The moving method of claim 11, wherein b) further comprises moving by applying an acceleration profile based on the natural period, the acceleration profile being derived from $$a_{acc}(t) = \frac{V_{ev}}{2nT}\left(1 - \cos\frac{\pi t}{nT}\right), 0 \le t \le 2nT$$

wherein $a_{acc}$ is the acceleration of an acceleration period, $V_{ev}$ is a constant velocity, n is a natural number, and T is a natural period.

18. The moving method of claim 17, wherein b) further comprises moving by applying a deceleration profile based on the natural period, the deceleration profile being derived from $$a_{dec}(t) = -a_{acc}(t), 0 \le t \le 2T$$

wherein $a_{acc}$ is the acceleration of an acceleration period, $a_{dec}$ is the acceleration of an deceleration period, $V_{ev}$ is a constant velocity, n is a natural number, and T is a natural period.

19. The moving method of claim 17, wherein the following equation is satisfied when a maximum value of the acceleration profile is lower than maximum acceleration of the wheels:

$$\text{Max}(a_{acc}(t)) = a_{acc}(T) = \frac{V_{ev}}{T} \le A_{\max}$$

wherein Max$(a_{acc})$ is the maximum value of an acceleration profile, and $A_{max}$ is the maximum acceleration of the wheel.

20. The moving method of claim 19, wherein b) further comprises:
adding a uniform acceleration period at a maximum speed profile for increasing the constant velocity and moving a total moving distance within a shorter period of time, the uniform acceleration period corresponding to an integer times the maximum speed profile when the maximum value of the acceleration profile satisfies the equation of claim 19 by reducing the constant velocity.

* * * * *